United States Patent
Batista

(10) Patent No.: US 11,940,870 B2
(45) Date of Patent: Mar. 26, 2024

(54) METHOD AND DEVICE FOR AUTOMATICALLY DETECTING POTENTIAL FAILURES IN MOBILE APPLICATIONS

(71) Applicant: FAURECIA APTOIDE AUTOMOTIVE, LDA, Avenidas Novas (PT)

(72) Inventor: Adriano Batista, Lisbon (PT)

(73) Assignee: FAURECIA APTOIDE AUTOMOTIVE, LDA, Avenidas Novas (PT)

( * ) Notice: Subject to any disclaimer, the term of this patent is extended or adjusted under 35 U.S.C. 154(b) by 0 days.

(21) Appl. No.: 17/970,536

(22) Filed: Oct. 20, 2022

(65) Prior Publication Data

US 2023/0121281 A1    Apr. 20, 2023

(30) Foreign Application Priority Data

Oct. 20, 2021 (PT) .......................... 117526

(51) Int. Cl.
  *G06F 11/00* (2006.01)
  *G06F 8/70* (2018.01)
  (Continued)

(52) U.S. Cl.
  CPC ................ *G06F 11/08* (2013.01); *G06F 8/70* (2013.01); *G06F 11/0766* (2013.01)

(58) Field of Classification Search
  CPC ............. G06F 11/0766; G06F 11/0769; G06F 11/302; G06F 8/70; G06F 8/74
  (Continued)

(56) References Cited

U.S. PATENT DOCUMENTS

| | | | |
|---|---|---|---|
| 2016/0321453 A1* | 11/2016 | Yang | G06F 21/562 |
| 2018/0025153 A1* | 1/2018 | Yang | G06F 21/562 |
| | | | 726/23 |
| 2023/0236813 A1* | 7/2023 | Strenski | G06F 8/51 |
| | | | 717/137 |

FOREIGN PATENT DOCUMENTS

| CN | 111198686 A | * | 5/2020 | |
| JP | 2017505944 A | * | 2/2017 | |
| WO | WO-2015101096 A1 | * | 7/2015 | G06F 21/55 |

OTHER PUBLICATIONS

Mandal Amit Kr et al., "Static analysis of Android Auto infotainment and on-board diagnostics II apps", Software-Practice and Experience, Mar. 25, 2019, pp. 1131-1161, vol. 49.

(Continued)

*Primary Examiner* — Chae M Ko
(74) *Attorney, Agent, or Firm* — Reising Ethington P.C.

(57) ABSTRACT

A method and a device for automatically detecting potential failures in mobile applications implemented on an operating system for mobile devices, a mobile application being executable on the operating system installed on a hosting device by executing code instructions stored in an associated executable file. Provided an executable file associated to a mobile application, the device implements a module for decompiling the executable file to obtain at least one descriptive file of the mobile application containing descriptive code formatted with a markup language, a module for providing a plurality of predetermined string patterns related to potential failures, and a module for searching for the presence of at least one of the string patterns in the at least one descriptive file, and in case of presence, outputting an indication of presence of a potential failure associated to the detected string pattern.

11 Claims, 2 Drawing Sheets

(51) Int. Cl.
  *G06F 11/08* (2006.01)
  *G06F 11/07* (2006.01)
(58) Field of Classification Search
  USPC .......................................... 714/26, 38.1, 57
  See application file for complete search history.

(56) References Cited

OTHER PUBLICATIONS

Chatzoglou Efstratios et al., "A Multi-Tier Security Analysis of Official Car Management Apps for Android", Future Internet, Feb. 25, 2021, pp. 1-35, vol. 13, 58.
Jha Ajay Kumar et al., "Characterizing Android-specific crash bugs", 2019 IEEE/ACM 6th International Conference on Mobile Software Engineering and Systems (MOBILESoft), IEEE, May 25, 2019, pp. 111-122.
Mujahid Suhaib et al., "Studying Permission Related Issues in Android Wearable Apps", 2018 IEEE International Conference on Software Maintenance and Evolution (ICSME), IEEE, Sep. 23, 2018, pp. 345-356.
European Search Report corresponding to European Application No. 21208515.3, dated May 23, 2022, 11 pages.

* cited by examiner

METHOD AND DEVICE FOR AUTOMATICALLY DETECTING POTENTIAL FAILURES IN MOBILE APPLICATIONS

FIELD OF THE INVENTION

The present invention concerns a method for automatically detecting potential failures in mobile applications implemented on an operating system for mobile devices, an associated device and an associated computer program.

The invention belongs to the field of securing the execution of mobile applications, more commonly designated as "mobile apps".

The invention may apply in particular in an automotive environment.

BACKGROUND

In the recent years, the use of mobile devices, implementing mobile applications, has increased exponentially. Such mobile applications are executed on operating systems for mobile devices, which provide a suitable execution environment, such as Android®. The use of mobile applications has been developed for various devices such as mobile phones, smart watches, tablet computers, and also for other types of mobile devices such as programmable devices integrated in automotive systems such as car dashboards.

The mobile applications are executable on the operating system by executing code instructions stored in an associated executable file, the code instructions being generated according to the operating system. Furthermore, the operating system provides so-called native libraries which can be used by a mobile application. A mobile application may further use resources or assets, the use of which may be related to the hardware resources of the device hosting the mobile application.

It is understood by potential failure in a mobile application any type of errors and/or undesired behaviors that might occur when the mobile application is run by the given operating system on a hosting device. The errors, for example, could be that the mobile application can not be run by the given operating system. The undesired behaviors, for example, could be that the mobile application is disconnect suddenly, or that the mobile application is showed partially on the hosting device.

It is useful to ensure that a given mobile application is capable of being executed without failures on a given hosting device. This is particularly useful when the hosting device or devices are devices within a security critical environment, which is the case of automotive devices.

However, executable files for mobile applications may be provided from external providers, and therefore there is a need to assess their compatibility with a given hosting device or devices.

A manual verification by an expert may be cumbersome and slow, especially if a large number of mobile applications is considered.

Therefore, there is a need to automatize the identification of potential failures of mobile applications executed on a predetermined operating system for mobile devices, run on a hosting device.

SUMMARY

This and other objects are achieved by a method for automatically detecting potential failures in mobile applications implemented on an operating system for mobile devices, a mobile application being executable on the operating system installed on a hosting device, by executing code instructions stored in an associated executable file. The method is implemented by a processor and comprises:
- provided an executable file associated to a mobile application, decompile said executable file to obtain at least a descriptive file of said mobile application containing descriptive code formatted with a markup language,
- provide a plurality of predetermined string patterns related to potential failures,
- search for the presence of at least one of said string patterns in the at least one descriptive file, and in case of presence, output an indication of presence of a potential failure associated to the detected string pattern.

Advantageously, the method proposed automatically detects one or several potential failures and outputs an indication of presence of a potential failure.

In embodiments of the invention, the method may include any of the following features, considered alone or according to all technically possible combinations.

The decompiling of said executable file comprises a first decompiling with resources further providing said at least one descriptive file and at least one associated resource folder.

The method further comprises searching for the presence of at least one of said string patterns in the or each of the resource folders, and in case of presence, recording an indication result of presence of a potential failure associated to the detected string pattern.

The decompiling of said executable file comprises, in case of failure of said first compiling with resources, applying a second decompiling without resources in order to obtain said at least one descriptive file.

The searching step comprises the searching for each of the predetermined string patterns of the plurality of predetermined patterns.

The method comprises a search in the at least one descriptive file for at least on predetermined string pattern related to a predicted lack of potential failure, and, if a predetermined string pattern related to a predicted lack of potential failure is found, output of an indication of positive outcome.

The predetermined string patterns related to potential failures are categorized in several categories corresponding to categories of potential failures.

Each output is recorded in a report file.

The operating system is Android operating system.

The invention relates also to a device for or automatically detecting potential failures in mobile applications implemented on an operating system for mobile devices, a mobile application being executable on the operating system installed on a hosting device by executing code instructions stored in an associated executable file. The device comprises a processor configured for implementing:
- provided an executable file associated to a mobile application, a module for decompiling said executable file to obtain at least one descriptive file of said mobile application containing descriptive code formatted with a markup language,
- a module for providing a plurality of predetermined string patterns related to potential failures,
- a module for searching for the presence of at least one of said string patterns in the at least one descriptive file, and in case of presence, outputting an indication of presence of a potential failure associated to the detected string pattern.

According to a particular embodiment, the output is recorded in a report file.

According to a particular embodiment, said operating system is Android operating system.

The invention relates also to a computer program comprising code instructions which, when they are executed by a programmable device, implement a method for automatically detecting potential failures in mobile applications implemented on an operating system for mobile devices as briefly described above.

According to another aspect, the invention relates to a non-volatile computer-readable medium storing a computer program comprising code instructions which, when they are executed by a programmable device, implement a method for automatically detecting potential failures in mobile applications implemented on an operating system for mobile devices as briefly described above.

BRIEF DESCRIPTION OF THE DRAWINGS

Further characteristics and advantages of the present invention will become apparent from the following description, provided merely by way of non-limiting example, with reference to the enclosed drawings, in which.

DETAILED DESCRIPTION OF EMBODIMENTS

Figure 1:
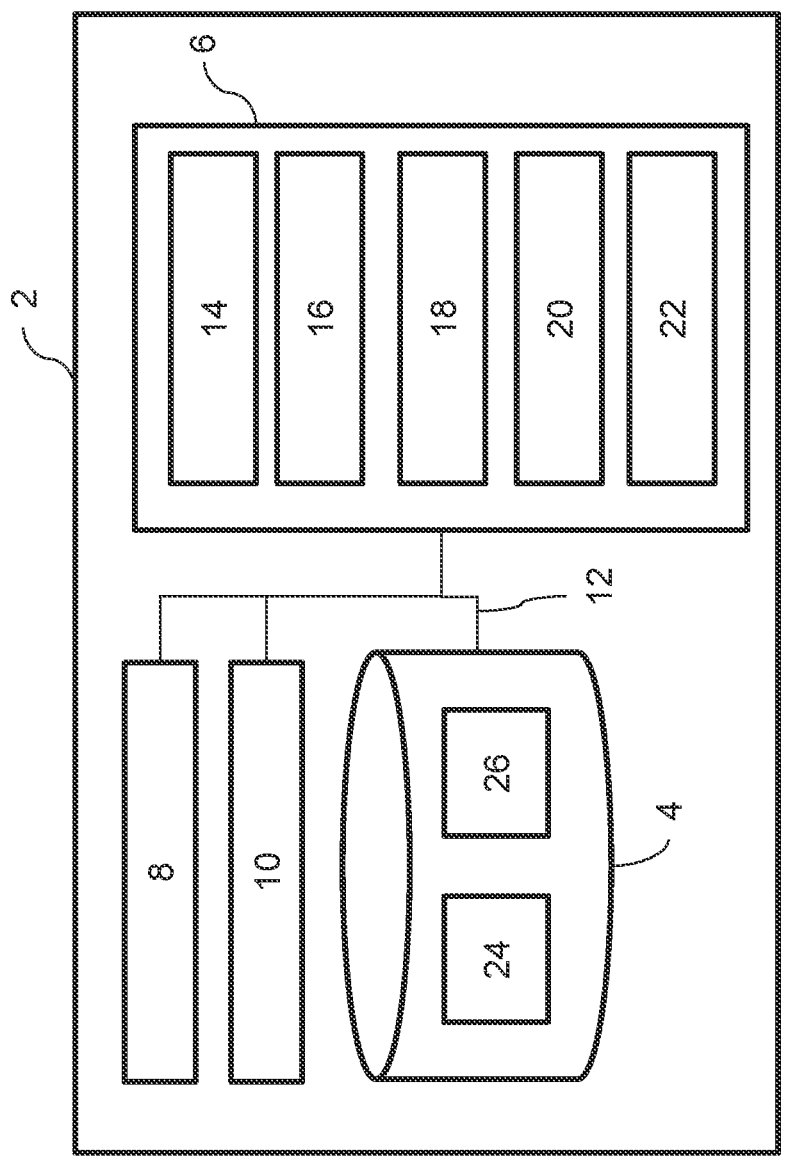
FIG. 1 represents schematically a device for automatically detecting potential failures in mobile applications according to an embodiment of the present invention.

The invention will be described hereafter in the context of mobile applications destined to be executed in an automotive environment.

It should be noticed however that the invention may also apply in different contexts, for example in an industrial environment.

In an automotive environment, the mobile applications are destined to be executed by an on-board computer, by an automotive system. Such mobile applications adapted for an automotive environment comprise for example mobile applications for music streaming, video-on-demand, games and productivity applications.

According to an embodiment, a device 2 for automatically detecting potential failures in mobile applications, when run on a given hosting device such as an automotive system, is a programmable electronic device, such as a computer.

The device 2 comprises an electronic storage memory 4, a central processing unit (CPU) 6, comprising at least one processor, and a communication interface 8. The communication interface is adapted to communicate via a wired or wireless communication technology, to transmit and receive data from a distant device, the distant device being a server of mobile applications.

The device 2 may also comprise a man-machine interface 10, comprising for example a display unit, a keyboard or another suitable device for receiving user input.

All the units 4, 6, 8, 10 of the device 2 are adapted to communicate via an internal bus 12.

The CPU 6 of the device 2 for automatically detecting potential failures in mobile applications is configured to implement:

a module 14 for obtaining at least one executable file associated to a mobile application, a module 16 for decompiling the executable file to obtain at least one descriptive file of the mobile application containing descriptive code formatted with a markup language, and optionally, several associated folders, as described in further detail hereafter;

a module 18 for providing a plurality of predetermined string patterns related to potential failures;

a module 20 for searching for the presence of at least one of the predetermined string patterns in the at least one descriptive file; and a module 22 for generating an output indication of presence of a potential failure associated to the detected string pattern.

According to an embodiment, the plurality of predetermined string patterns related to potential failures are previously determined and stored in a file 24 in the electronic storage memory 4.

According to an embodiment, the generating module 22 generates an output file 26, which is also stored in the electronic storage memory 4.

For example, the output file 26 has a CSV (for "comma-separated values") file format and comprises a list of indications of categories of potential failures associated to detected string patterns.

According to a preferred embodiment, the operating system for mobile applications is the Android® operating system (OS).

In such a case, the executable file is a an APK file, and the descriptive file of the mobile application, obtained by decompiling the APK file, is an Android Manifest file, typically formatted in XML (for eXtended Markup Language), which is a well known markup language.

According to an embodiment, modules 14, 16, 18, 20 and 22 are implemented as software, in the form of a computer program comprising instructions, which, when they are executed by the programmable device 2, implement a method for automatically detecting potential failures in mobile applications. The computer program may be stored on a non-volatile information recording medium, readable by a computer, such as an optical disk, a magneto-optical disk, any type of non-volatile memory (e.g. EPROM, EEPROM, FLASH, NVRAM), a magnetic card or and optical card.

Alternatively, the modules 14, 16, 18, 20 and 22 are stored on a non-volatile information recording medium, such as an optical disk, a magneto-optical disk, any type of non-volatile memory (e.g. EPROM, EEPROM, FLASH, NVRAM), a magnetic card or and optical card.

According to another alternative, each of the modules 14, 16, 18, 20 and 22 is implemented by a FPGA (Field Programmable Gate Array), or a dedicated integrated circuit such as an ASIC (Applications Specific Integrated Circuit).

Figure 2:
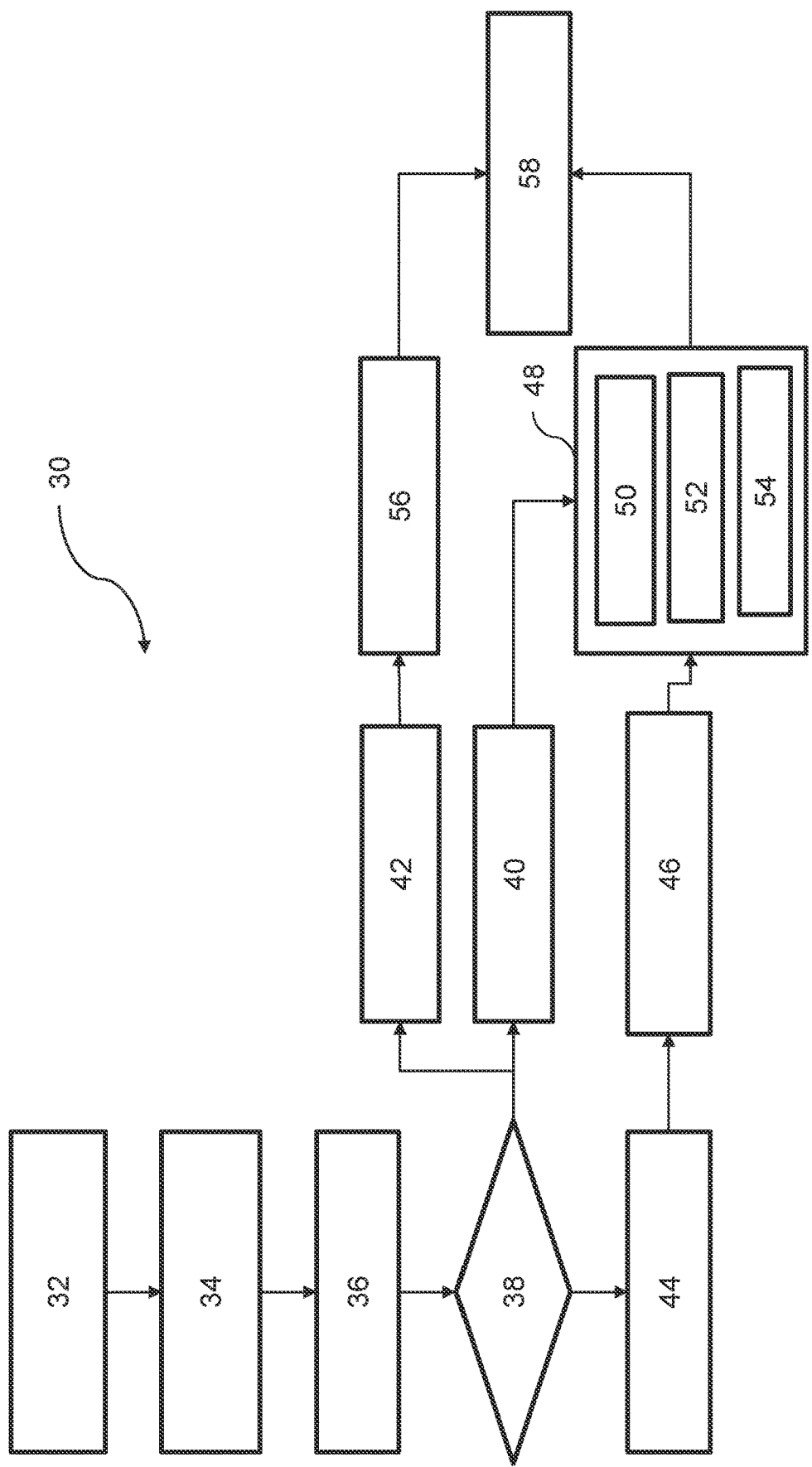
FIG. 2 is a flowchart of the main step of a method for automatically detecting potential failures in mobile applications according to an embodiment of the invention.

The main steps of a method for automatically detecting potential failures in mobile applications implemented on an operating system for mobile devices will be described below, with reference to FIG. 2.

In the present non limiting embodiment, the operating system for mobile devices is Android® OS, in an automotive environment.

The method 30 comprises a preliminary step 32 of determining and storing a plurality of string patterns related to potential failures. Examples of string patterns related to potential features will be given below.

In particular, the strings patterns related to potential failures are related to hardware and software capabilities of the expected hosting device, e.g. automotive system.

The method further comprises a step 34 of obtaining an executable file associated to a mobile application, which is an APK file for an Android® mobile application.

For example, the APK file is downloaded from an external source, such as an external server.

Next a first decompiling 36 with resources is applied on the APK file using Apktool®, which is a decompiling and recompiling tool provided by the Android® OS.

The resources are typically files acquired by an application such as patch images, layouts, styles and strings for example.

The decompiling with resources is a type of decompiling taking into account potential resources to be used for executing the executable file retrieved at step 32.

If the first decompiling 36 with resources succeeds (positive outcome at checking step 38), a package is obtained by the decompiler, the package comprising one or several descriptive files and at least one folder containing at least one resource.

According to an embodiment, a descriptive file which is an AndroidManifest file is obtained by the first decompiling.

The method then comprises obtaining 40 the descriptive file (e.g. AndroidManifest file) and obtaining 42 one or several associated folders from the package. The descriptive file and the associated folders are temporarily memorized for further processing.

The descriptive file or manifest file is a file formatted in XML comprising information about the mobile application, describing the name, version and contents of the APK file.

Several types of associated folders may be obtained depending on the APK file, comprising:

resource folders comprising two types of resource folders:
    first resource folders comprising data such as images which are not compiled, and second resource folders comprising compiled resources such as strings;
  SMALI code folders, SMALI being an assembly language for Android applications.

If the first decompiling 36 with resources fails (negative outcome at checking step 38), then a second decompiling 44 without resources is applied, and a descriptive file (e.g. AndroidManifest file) is obtained at step 46.

The method further comprises applying 48 a potential failure detection on the descriptive file (e.g. Manifest file), obtained either by the first decompiling 36 or by the second decompiling 44.

According to an embodiment, the step 48 comprises:
  providing 50 a plurality of predetermined string patterns related to potential failures, and searching 52 for the presence of at least one of the string patterns in the descriptive file.
  According to a variant, the searching 52 of every pattern listed in a filed containing the predetermined string patterns related to potential failures is applied.

For example, the plurality of predetermined string patterns are grouped in several categories comprising the following non-exhaustive list: DRM (for"digital rights management") related string patterns, comprising:
  drm, widevibe, exoplayer, clearkey
  GMS (for Google Mobile Services) related string patterns, comprising for example;
    ('com.google.android.geo.API_KEY', 'com.google.android.maps.v2.API_KEY', 'com.goo gle.android.gms.wallet.api.enabled', 'com.google.android.nearby.messages.API_KE Y", 'com.google.android. safetynet.ATTEST_API_KEY','com.google.android.gms.ga mes.APP_ID', 'com.android.vending.BILLING', 'com.google.android.providers.gsf.pe rmission.READ_GSERVICE')
  Display related patterns:
    Widescreen related string patterns;
    Portrait-only string patterns Each of the categories listed above is associated to a type of potential failure.

In particular, if one or several of the string patterns of the categories DRM and GMS are found, potential incompatibilities with the hardware or operating system of the hosting device might occur, which are considered as being potential failures.

For example, if the tested mobile application requires a certain type of DRM system to run a given type of media content and the type of DRM system is not supported by the system destined to run the mobile application (e.g. the on-board automotive system), then the mobile application is not fully compatible with the system destined to run the mobile application. This lack of full compatibility is considered to be a potential failure.

A similar lack of full compatibility may occur for the mobile application requirements of Google Mobile Services.

The display related patterns may indicate an impossibility to display some images with a satisfactory quality on the display screen of the hosting device.

For example, if the mobile application descriptive file comprises a tag "android:screenOrientation=" "portrait", and considering a hosting device which has a display of "landscape" orientation, then a potential failure related to the display is predicted.

For example, if the mobile application does not allow autoresizing and the aspect ratio of the display is set to a value which is not compatible with the display screen of the hosting device, a potential failure is predicted.

Additionally, it is also proposed to detect 54 the presence of one or several string patterns in the descriptive file which correspond to a positive outcome, i.e. a guarantee of absence of potential failure, and to report also an indication of such positive outcome.

For example a plurality of predetermined string patterns corresponding to a positive outcome, grouped in several categories comprise:
  Media Browser Service (MBS): for example, if the tag 'android.media.browse.MediaBrowserService' is present, a positive outcome is predicted;
  Driving Mode:
    for example, if the tag 'com.google.android.gms.car.application' is present, then the mobile application is considered compatible with an automotive environment and a positive outcome is predicted;
  Automotive executable file:
    for example, of the tag 'android.hardware.type.automotive' is present, a positive outcome is predicted.

The method further comprises, in the case where the first decompiling with resources has succeeded, applying a potential failure detection 56 on the resource folders obtained from the decompiled package (step 42).

In particular, the resources files are checked for 4K UHD (for "UltraHigh Definition") related tags.

Furthermore, the SMALI code folders are checked to determine the presence of DRM and GMS related string patterns.

According to an embodiment, the failure detection 56 applies a search of the same string patterns mentioned above as an example.

The results of steps 48 and 56 of applying potential failure detection on the descriptive file and on the associated folders, if any, are followed by the outputting 58 of a report folder.

For each potential failure found, an indication of presence of the potential failure is recorded in an output report file. Preferably, an indication of the category of potential failure and/or the detected string pattern are also recorded in the output report file.

Optionally, the detected positive outcomes and the related strings patterns detected are also recorded in the output report file.

According to an embodiment, the output report file is in CSV format, which advantageously makes it easy to parse for further analysis, so as to trigger a corrective action if necessary. The corrective action may be an automatic action or a user action to check the mobile application before installing it on the intended hosting device.

Advantageously, the method proposed helps ensuring that the mobile applications installed on given hosting device, such as an automotive device, are adapted to be executed by the hosting device, without potential failures, ensuring security at runtime and ensuring that an expected service is delivered to a user.

Advantageously, the testing of mobile applications before installing them is facilitated.

The invention claimed is:

1. A method for automatically detecting potential failures in a mobile application implemented on an operating system for mobile devices, the mobile application being executable on the operating system installed on a hosting device, by executing code instructions stored in an associated executable file, the method being implemented by a processor and comprising:
   provided an executable file associated to a mobile application, decompiling said executable file to obtain at least a descriptive file of said mobile application containing descriptive code formatted with a markup language,
   providing a plurality of predetermined string patterns related to potential failures, and
   searching for a presence of at least one of said string patterns in the at least one descriptive file, and in case of said presence of a detected string pattern, outputting an indication of a potential failure associated with the detected string pattern,
   wherein the decompiling of said executable file comprises a first decompiling with resources further providing said at least one descriptive file and at least one associated resource folder, the decompiling of said executable file further comprising, in case of failure of said first decompiling with resources, applying a second decompiling without resources in order to obtain said at least one descriptive file.

2. The method of claim 1, further comprising searching for the presence of at least one of said string patterns in the or each of the resource folders, and in case of said presence, recording an indication result of presence of a potential failure associated to the detected string pattern.

3. The method according to claim 1, wherein the searching step comprises searching for each of the predetermined string patterns of the plurality of predetermined patterns.

4. The method according to claim 1, further comprising a search in the at least one descriptive file for at least one predetermined string pattern related to a predicted lack of potential failure, and, if a predetermined string pattern related to a predicted lack of potential failure is found, output of an indication of positive outcome.

5. The method according to claim 1, wherein the predetermined string patterns related to potential failures are categorized in several categories corresponding to categories of potential failures.

6. The method according to claim 1, wherein each output is recorded in a report file.

7. The method according to claim 1, wherein said operating system is Android operating system.

8. A non-volatile, computer-readable medium storing a computer program comprising code instructions which, when they are executed by a programmable device, implement a method for automatically detecting potential failures in mobile applications implemented on an operating system for mobile devices according to claim 1.

9. A device for automatically detecting potential failures in a mobile application implemented on an operating system for mobile devices, the mobile application being executable on the operating system installed on a hosting device by executing code instructions stored in an associated executable file, the device comprising a processor configured for implementing:
   a module for providing an executable file associated to a mobile application, a module for decompiling said executable file to obtain at least one descriptive file of said mobile application containing descriptive code formatted with a markup language,
   a module for providing a plurality of predetermined string patterns related to potential failures, and
   a module for searching for a presence of at least one of said string patterns in the at least one descriptive file, and in case of said presence of a detected string pattern, outputting an indication of a potential failure associated to the detected string pattern,
   wherein the module for decompiling of said executable file implements a first decompiling with resources further providing said at least one descriptive file and at least one associated resource folder, the module for decompiling of said executable file further implements, in case of failure of said first decompiling with resources, applying a second decompiling without resources in order to obtain said at least one descriptive file.

10. The device according to claim 9, wherein the output is recorded in a report file.

11. The device according to claim 9, wherein said operating system is Android operating system.

* * * * *